United States Patent
Carroll et al.

(10) Patent No.: US 11,228,490 B1
(45) Date of Patent: Jan. 18, 2022

(54) STORAGE MANAGEMENT FOR CONFIGURATION DISCOVERY DATA

(71) Applicant: Amazon Technologies, Inc., Seattle, WA (US)

(72) Inventors: Theodore Carroll, Seattle, WA (US); Karthikeyan Natarajan, Fremont, CA (US); Hariharan Subramanian, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 428 days.

(21) Appl. No.: 15/385,796

(22) Filed: Dec. 20, 2016

(51) Int. Cl.
*H04L 12/24* (2006.01)
*H04L 29/08* (2006.01)

(52) U.S. Cl.
CPC ...... *H04L 41/0853* (2013.01); *H04L 41/0866* (2013.01); *H04L 67/1097* (2013.01); *H04L 67/16* (2013.01)

(58) Field of Classification Search
CPC ............ H04L 41/0853; H04L 41/0866; H04L 67/1097; H04L 67/16
USPC .......................................................... 707/756
See application file for complete search history.

(56) References Cited

U.S. PATENT DOCUMENTS

| | | | |
|---|---|---|---|
| 7,139,894 B1 * | 11/2006 | Mensching ........... | G06F 9/5016 711/170 |
| 7,222,147 B1 * | 5/2007 | Black ................. | H04L 41/0803 709/200 |
| 2002/0057018 A1 * | 5/2002 | Branscomb .......... | H04L 63/102 307/42 |
| 2005/0144188 A1 * | 6/2005 | Bailey ................ | G06Q 10/0639 |
| 2005/0198247 A1 * | 9/2005 | Perry .................... | H04L 7/0008 709/223 |
| 2006/0146731 A1 * | 7/2006 | Lewis .................... | H04W 48/16 370/254 |
| 2007/0005746 A1 | 1/2007 | Roe et al. | |
| 2008/0114770 A1 * | 5/2008 | Chen .................... | G06F 16/256 |

FOREIGN PATENT DOCUMENTS

| | | |
|---|---|---|
| CN | 102377786 | 3/2012 |
| CN | 103714050 | 4/2014 |
| WO | 2012102863 | 8/2012 |

OTHER PUBLICATIONS

CloudEndure, "Simple Migration to the Cloud with No Downtime," 2014 copyright, downloaded from https://www.cloudendure.com/cloudmigrationproduct/on Sep. 30, 2015, pp. 1-10.

(Continued)

*Primary Examiner* — Mohammad S Rostami
*Assistant Examiner* — Saba Ahmed
(74) *Attorney, Agent, or Firm* — Robert C. Kowert; Kowert, Hood, Munyon, Rankin & Goetzel, P.C.

(57) ABSTRACT

An initial set of one or more data stores is selected for storing configuration data of a first client of a configuration discovery service. Configuration data for various items of the client's computing environment are stored at the initial set for a first time period. A configuration item, whose records were being stored at a first data store, is identified as a candidate for a data store change. Storing of at least some configuration data of the item at a different data store is initiated.

21 Claims, 9 Drawing Sheets

(56) References Cited

OTHER PUBLICATIONS

Racemi Business Systems Agility, "Cloud Migration Software—Server Migration Software," Racemi 2015, downloaded from http://www.racemi.com/ on Sep. 30, 2015, pp. 1-2.

ScienceLogic, Inc. 2015, "The ScienceLogic Platform—Complete Hybrid IT Monitoring," downloaded from https://www.sciencelogic.com/product on Sep. 30, 2015, pp. 1-14.

RISC Networks (2015), "CloudScape", downloaded from http://www.riscnetworks.com/cloudscape/ on Sep. 30, 2015, pp. 1-13.

U.S. Appl. No. 14/871,701, filed Feb. 3, 2016, Hariharan Subramanian, et al.

U.S. Appl. No. 15/189,983, filed Jun. 22, 2016, Hariharan Subramanian, et al.

U.S. Appl. No. 15/189,979, filed Jun. 22, 2016, Hariharan Subramanian, et al.

U.S. Appl. No. 15/189,976, filed Jun. 22, 2016, Hariharan Subramanian, et al.

\* cited by examiner

STORAGE MANAGEMENT FOR CONFIGURATION DISCOVERY DATA

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization (e.g., an enterprise data center), and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Each such virtual machine can be thought of as a software simulation acting as a distinct logical computing system that provides users with the illusion that they are the sole operators and administrators of a given hardware computing resource, while also providing application isolation among the various virtual machines.

A sophisticated application's execution environment may span a wide variety of resources—e.g., some components of the application may be run using a virtual machines, while others may be run using un-virtualized servers. In some cases, the resources of an application or a related set of applications may be distributed among several different data centers. The complexity of the execution environment may make it difficult to obtain a full understanding of the relationships and dependencies among various application components. Such a lack of clarity may in turn make it harder to take consequential business decisions such as migrating applications from customer-owned premises to provider network environments.

Figure 1:
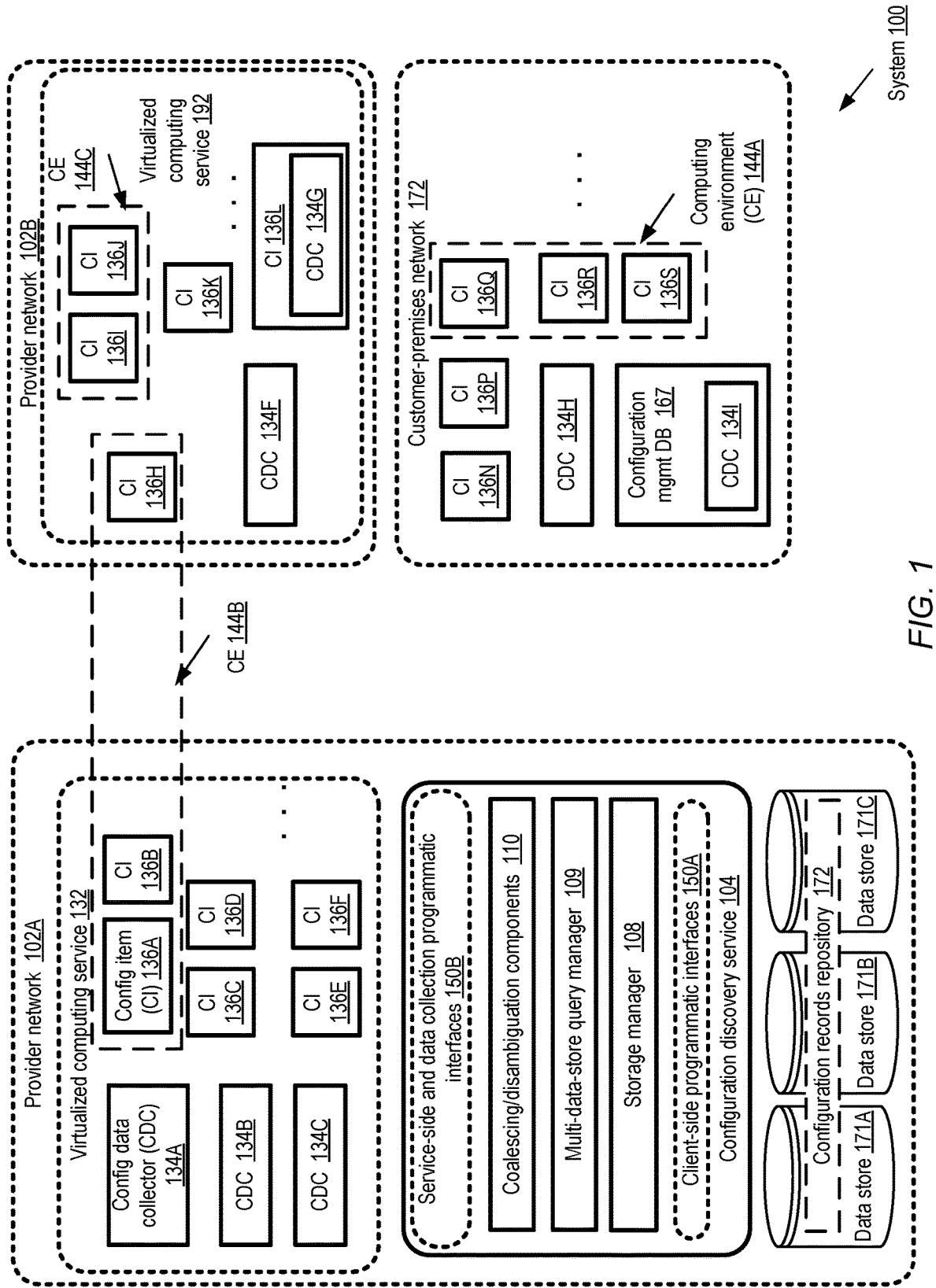
FIG. 1 illustrates an example system environment in which an intelligent configuration discovery service for multi-data-center applications may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for managing the storage of configuration data collected on behalf of clients of a network-accessible discovery service are described. At a high level, in at least some embodiments the configuration discovery service may enable (among other features) the automated detection of configuration items (such as physical or virtualized compute servers, storage devices, databases, software stack components and the like that make up an application) based on raw data collected from a variety of data sources, the assignment of unique identifiers to configuration items, the tracking of interactions (e.g., transactions, network traffic flows etc.) and dependencies among the items, changes in application configuration over time, as well as the storage of the collected data across a variety of back-end data stores. Multiple data stores, potentially implementing respective distinct data models and respective distinct query languages or interfaces, may be usable for configuration data collected and processed by the configuration discovery service in some embodiments. The set of data stores that is used for a given client's configuration data may be changed over time based on a variety of factors in different embodiments as discussed below, e.g., to ensure that responses to the client's configuration-related queries can be provided with a desired performance level, and that any batch jobs being performed on behalf of the client on configuration data meet desired performance levels, despite growth of the client's configuration data set.

Batch jobs may be executed, for example, in some embodiments to obtain results of analytics algorithms, machine learning models and the like on potentially large collections of configuration records. In at least some embodiments, changes to the storage configuration (i.e., the particular combination of data stores) being used for a given client's configuration may be implemented transparently—e.g., in such a way that the client's user experience is not affected negatively by the changes. In one embodiment, a client may not necessarily be informed or made aware of at least some changes to the storage configuration.

The configuration discovery service may also be referred to as an application discovery service or as a resource discovery service in some environments, as the configuration items are the components that form an application. The configuration discovery service may implement a variety of programmatic interfaces (e.g., web service application program interfaces, command line interfaces, etc.) which can be used by service clients to obtain responses to configuration-related queries, and/or the results of batch jobs which may be performed on behalf of the clients on their configuration data. In some embodiments, a visualization service affiliated with or part of the configuration discovery service may serve as one of the primary modes of interaction for clients of the configuration discovery service—e.g., a customer may be able to view customized visual representations of their application execution environments adapted to the particular client-side display environment being used, issue configuration-related queries via the visualization interface, and/or initiate partial or full application migrations from one set of resources to another.

In at least some embodiments, the configuration discovery service and/or its affiliated visualization service may be implemented at a provider network. Networks set up by an entity such as a company or a public sector organization to provide one or more network-accessible services (such as various types of cloud-based computing or storage services) accessible via the Internet and/or other networks to a distributed set of clients may be termed provider networks herein. A provider network may sometimes be referred to as a "public cloud" environment. The resources of a provider network may in some cases be distributed across multiple data centers, which in turn may be distributed among numerous cities, states and countries. It is noted that while the configuration discovery service may be implemented within a particular provider network, in at least one embodiment the service may be authorized and granted the appropriate permissions to access information from other provider networks (e.g., from provider network run by a different business organization). For example, a configuration discovery service running at a provider network PN1 run by operator O1 may be able to gather configuration data collected from a provider network PN2 run by operator O2 (as well as from other facilities such as client-owned data centers and PN1's own data centers). A configuration discovery service may also be referred to herein simply as a discovery service.

According to one embodiment, a client of a configuration discovery service may indicate, using a programmatic interface, a computing environment from which configuration data is to be discovered and collected on the client's behalf. The computing environment may comprise a variety of configuration items (e.g., physical or virtual servers, storage devices, various layers of application stacks, etc.) at one or more data centers. The service may select an initial set of one or more data stores at which at least a portion of configuration data collected from the computing environment is to be stored. In some embodiments, a single data store may be selected, while in other embodiments, several different data stores may be included in the initial set, such as an instance of a relational database and an instance of a non-relational database. An example algorithm which may be implemented to select the initial set of data stores in one embodiment is discussed below in the context of FIG. 8. Configuration data, collected from various configuration items identified in the computing environment, may be processed and stored at the initial set of data stores for at least a particular time period in some embodiments. Based at least in part on one or more factors such as an analysis of queries or jobs processed on behalf of the client at the configuration discovery service or a size metric of the configuration data, in one embodiment the service may identify one or more configuration items (or all the configuration items) as candidates for a data store change. For example, if configuration data of a particular configuration item was stored at a first data store initially, and the rate at which that configuration data is being threshold exceeds a threshold, a different data store may be selected for storing at least some of the configuration data of the item. The storage of the configuration data of the candidate configuration items may be initiated at the newly-selected data stores. In one embodiment, the configuration discovery service may optionally verify, after initiating the change to the back-end storage configuration, that a user experience metric of additional queries/jobs processed on behalf of the client meets an acceptance criterion. For example, the performance of queries or batch jobs processed at the service on behalf of the client after the change may be checked to ensure that it has not degraded (relative to the performance measured before the change) in one implementation. If the user experience metric is not found to be acceptable, in one embodiment remedial actions may be initiated at the service—e.g., additional resources may be deployed to improve the user experience metric, or the change to the back-end data store configuration may be undone.

In at least some embodiments, as mentioned earlier, some of the data stores used for the configuration data may implement different data models, data formats and/or query languages/interfaces than others. In one such embodiment, the configuration discovery service may comprise a multi-data-store query manager that is capable of detecting that a client's submitted query (or a batch job required to fulfill a client request) may require access to data stored at several different back-end data stores, generating the appropriate intermediary queries or sub-queries to the appropriate set of data stores in the corresponding data-store dependent query languages, transmitting the sub-queries to the respective data stores using the appropriate data-store dependent interfaces, and aggregating the responses received from the respective data stores on behalf of the client. The multi-data-store query manager may comprise a performance monitor in one embodiment, which may be used to measure the responsiveness of the service to client queries and/or batch job requests, before and after various storage configuration changes are made.

In some embodiments, the configuration discovery service may implement back-end storage configuration changes in a variety of ways. Consider an example scenario in which a decision is made that the data store to be used for at least some configuration records associated with a set CIS-1 of configuration items of a client C1 is to be changed from data store DS1 to data store DS2. In one example implementation decision, based for example at least in part on an analysis of one or more dimensions of the distribution of configuration requests being submitted by the client C1, at least some of the already-stored configuration records of CIS-1 may be copied or migrated to DS2, and new configuration data (i.e., data processed after the decision is made) pertaining to CIS-1 may also be directed to DS2. In some embodiments, the distribution dimensions being considered may include, for example, time (e.g., the collection times of the configuration records targeted by the queries or jobs of the clients), the subsets of configuration items targeted, and so on. In another example implementation decision, the records that were already stored in DS1 may be retained in DS1, and only the new records generated after a selected transition time may be stored at DS2. In a third example implementation decision, older configuration records of CIS-1 may be migrated to DS2, while new configuration data of CIS-1 may continue to be stored at DS1. In at least one embodiment, clients may indicate preferences, e.g., via programmatic interfaces implemented by the discovery service, regarding the types of data stores to be used for their configuration data, and such preferences may guide the data store selections made by the service. In some embodiments, clients may indicate security and/or data isolation constraints or preferences for some or all of their configuration data, and the discovery service may take such constraints into account when selecting the data stores.

A wide variety of data sources may be employed at the configuration discovery service to build up a repository of configuration records on behalf of various clients. For example, in some embodiments, the data sources may include existing configuration management databases at client data centers (from which configuration data may sometimes be imported in bulk via programmatic interfaces), agents or configuration data collectors installed on behalf of the configuration discovery service at various resources, third-party or industry-standard configuration management tools, and so on. Each data source may provide configuration information, e.g., including some number of attribute-value pairs for some set of configuration items, to the configuration discovery service at one or more points in time. Some data sources may provide raw configuration data at regular intervals, while others may be event-driven in at least some embodiments. The configuration item attributes for which values are obtained at the service (e.g., via agents installed on behalf of the service) in various embodiments may include, among others, user information (such as user names and home directories), group information (such as group names and group membership), lists of installed software packages/programs, and lists of kernel modules. Information about a number of different types of configuration-related events, such as process creations/terminations (with associated process identifiers), Domain Name Service (DNS) queries and responses, packet sends and receives at various layers of networking stacks and so on may also be collected in at least some embodiments. Values of various attributes of the physical and/or virtual network interfaces (including for example the type of network interconnect such as Ethernet which is being used, the maximum bandwidth supported, associated media access control or MAC addresses etc.) may be collected from the devices of the targeted execution environments. The particular network ports, such as TCP (Transmission Control Protocol) or UDP (User datagram Protocol) ports being used at various resources may be identified, and TCP version 4 or version 6 connection attributes (such as the identifiers of the processes at either end of the connections, the connection establishment times, the durations for which the connections remain open, etc.) may be collected. Operating system-related attributes, including for example the specific versions of the operating system in use at various hosts and virtual machines, may be collected in some embodiments. System performance and process performance metrics may be collected at various intervals in different embodiments. In some embodiments, a plurality of agents of the discovery service may be installed at a given host or device to collect respective subsets of the configuration attribute values for one or more configuration items; in other embodiments, a single agent or tool may be able to extract attribute values from several different sources.

The configuration discovery service may act as a combiner and curator of potentially out-of-date, conflicting and/or ambiguous raw configuration information collected from various data sources at respective levels of granularity and according to respective schedules. From disparate data sources, in some embodiments the configuration discovery service may be responsible for generating and storing coalesced and curated configuration records; such coalesced records may serve as the authoritative sources of configuration data for the visualization service and/or other services relying on the discovery service. In at least some embodiments, the configuration discovery service may generate and assign unique service-side identifiers to respective configuration items based at least in part on an ontology defined by the service. For example, a given hardware server may be identified by one data source based on one of the server's IP addresses (which may be changed over time), by another data source based on a server name or MAC (media access control) address, by a third data source based on the role (e.g., "web server" or "database server") being played by the server in a distributed application, and so on. The data sources may each include their own respective identifiers/names for the server in the raw configuration data provided to the configuration discovery service. Such identifiers may be referred to herein as data-source-side identifiers. The configuration discovery service may examine the raw configuration data received from one or more of the different data sources or collectors, and generate a unique service-side identifier for the server based on the defined ontology and a naming scheme (which may take a subset of the raw data's attribute values into account).

In at least some embodiments, the configuration discovery service may associate respective trust scores with different data sources, and such trust scores may be used when deciding which among a set of potentially conflicting or out-of-date configuration data elements is to be accepted. The trust scores may themselves change over time—for example, if a dump of a client's configuration management database representing a client data center is obtained at the service, the initial trust score for the client's database may be set to a high value, but the score may be reduced as time passes and configuration changes occur at the client data center. Trust scores may be used when generating the coalesced configuration records from the raw configuration data in at least some embodiments—e.g., attribute values obtained from a high-trust data source may be included with a greater probability in a coalesced record than attribute values obtained from a low-trust data source. In a scenario in which an attribute value V1 from a data source DS1 with a current trust score TS1 contradicts or conflicts with an attribute value V2 from a different data source DS2 with a higher current trust score TS2, the attribute value (V2 in this case) from the source with the higher trust score may be included in the coalesced configuration record, and the attribute value from the source with the lower trust score may be excluded. In at least some embodiments, machine learning techniques may be employed to generate and update trust scores over time.

Example System Environment

FIG. 1 illustrates an example system environment in which an intelligent configuration discovery service for multi-data-center applications may be implemented, according to at least some embodiments. As shown, system 100 may comprise a plurality of provider networks, such as provider networks 102A and 102B, as well as a customer-premises network 172 in the depicted embodiment. Within each of the provider networks 102, one or more network-accessible services may be implemented by respective provider network operators. For example, provider network 102A comprises the configuration discovery service 104 and a virtualized computing service 132. Provider network 102B may include its own virtualized computing service 192, at which a different approach towards virtualizing compute servers may be utilized than is used in virtual computing service 132—e.g., different types of hypervisors or virtualization management software stacks may be used, different sets of programmatic interfaces may be supported for acquiring and using virtual machines, and so on.

A number of distributed applications may be run on behalf of various customers using the resources of provider networks 102A and 102B and/or customer-premises network 172 in the depicted embodiment. The set of resources being used for a given application or a related set of applications may be referred to herein as a computing environment (CE) 144. A given CE may comprise a wide variety of resources—e.g., virtual and/or physical compute servers, storage devices, networking devices, multi-layer software stacks and the like. At least some of the resources may comprise configuration items (CIs) 136 about which respective sets of configuration information (e.g., a collection of attribute values) is collected and stored within the configuration discovery service 104. In the depicted embodiment, from the perspective of the configuration discovery service and its clients, a configuration item 136 may comprise any physical, virtual or logical entity whose configuration settings and/or state information may be useful for managing one or more applications, and can be obtained via programmatic interfaces by the configuration discovery service or by intermediaries acting on behalf of the configuration discovery service. Example configuration items may comprise, among others, a non-virtualized hardware server, a virtual machine, a software process or collection of related processes, a storage device such as a rotating magnetic disk or a solid-state drive (SSD), a network device such as a router, and so on. In some embodiments, the configuration discovery service may obtain respective data sets of configuration data about a given configuration item 136 from one or more intermediary configuration data collectors (CDCs) 134 iteratively—e.g., at regular intervals or in response to the occurrence of specified events. In the latter scenario, the configuration data stored at the service 104 may comprise a plurality of timestamped records for the configuration item. A number of different types of configuration data collectors may be employed in various embodiments, such as for example software and/or hardware agents that are installed on behalf of the configuration discovery service 104, industry-standard configuration management tools, custom configuration management tools, customer configuration management databases, and the like.

The raw configuration information collected from the configuration items 136 may be processed in the depicted embodiment, e.g., at the configuration discovery service 104 and/or at the CDCs 134, and corresponding configuration records derived from the raw data may be stored in a configuration records repository 172. The repository may be distributed among several data stores 171, such as 171A-171C, in some embodiments. In one embodiment, the configuration records associated with a given CE 144, such as 144A, 144B or 144C, may be stored at one or more data stores 171, and the set of data stores used for a given CE 144 may change over time. An initial set of one or more data stores 171 may be selected by the storage manager 108 of the discovery service 104, e.g., at (or prior to) the time that the process of discovery of configuration data is initiated on behalf of a client. That initial set of data stores may be used for some period of time in the depicted embodiment. In some embodiments, the discovery service may monitor various aspects of the configuration data stored on behalf of a client—e.g., the total size of the configuration data may be tracked, the distributions (in space and time) of queries directed towards the data may be monitored, preferences expressed by clients using client-side programmatic interfaces 150A of the service may be examined, and so on. Based on any combination of one or more factors or triggering conditions, as discussed below in further detail, in one embodiment a decision may be made by the storage manager 108 to change the set of destination data stores 171 being used for the configuration records of one or more configuration items of a computing environment 144. Subsequent to the decision, at least a subset of the configuration data pertaining to the computing environments may be stored at a different data store 171 in the depicted embodiment. In some embodiments, the discovery service 104 may be responsible for verifying that the change to the set of data stores does not result in a degradation in performance (or other aspects of user experience) for configuration-related queries directed by clients to the service.

In one embodiment, some of the data stores 171 may implement different data models, query languages, or query interfaces than others. For example, one data store may support the relational data model, another may implement a particular non-relational or "NoSQL" model, a third may allow the storage of unstructured data objects to which access is provided by web-services interfaces, and so on. A multi-data-store query manager 109 may be responsible in some embodiments for responding to client-submitted queries directed at the clients' configuration data. A data store-independent set of programmatic interfaces and corresponding data store-independent query language may be supported for client queries by the service 104 in some embodiments. When a client's query, expressed in the data-store independent language, is received at the service 104, the query manager 109 may determine the set of one or more back end data stores 171 at which configuration data pertinent to the query currently happens to be stored in the depicted embodiment. The client's original query may be translated into one or more intermediate queries in such an embodiment, expressed in respective query languages of the data stores 171 identified, and transmitted to the appropriate data stores via the respective data store-specific query interfaces. The results to the intermediate queries may be aggregated by the query manager 109, and an aggregated response may be provided to the client using the data store-independent interface and language of the configuration discovery service 104 in the depicted embodiment.

Some CEs, such as CE 144A or CE 144C, may comprise resources within the boundaries of a given network in the depicted embodiment. CE 144A comprises configuration items 136Q, 136R and 136S of customer-premises network 172, while CE 144C comprises configuration items 136I and 136J of provider network 102B. Other CEs may comprise configuration items distributed among multiple networks and/or data centers. For example, CE 144B comprises configuration items 136A and 136B of provider network 102A, as well as configuration item 136H of provider network 102B. It is noted that over the course of time, at least in some embodiments the mappings between a CE 144 and the networks at which configuration items of the CE are located may change—e.g., one or more configuration items may be migrated to a different provider network, from a customer-premises network to a provider network or from a provider network to a customer-premises network.

In the depicted embodiment, each network may comprise a plurality of configuration data collectors (CDCs) 134, which may communicate with the configuration discovery service 104. For example, provider network 102A comprises CDCs 134A-134C, which may be collectively responsible for obtaining and transmitting configuration data sets for configuration items 136A-136F to the service 104. Similarly, provider network 102B comprises CDCs 134F and 134G responsible for reporting on configuration items 136H-136L, while customer-premises network 172 comprises CDCs 134H and 134I responsible for transmitting configuration data sets pertaining to configuration items 136N and 136P-136S to service 104. In some cases, a given CDC 134 may be responsible for collecting configuration data pertaining to a plurality of configuration items 136, while in other cases a CDC 134 may report on a single configuration item 136. At least for some configuration items 136, configuration data sets may be collected by a plurality of CDCs 134—e.g., at respective levels of granularity and/or at respective layers of the software/hardware stack. In some embodiments, a given CDC 134 may be a subcomponent of a configuration item 136—e.g., as a process or thread of execution running at a server which represents the configuration item. For example, data source 134G is shown as part of configuration item 136L. Some configuration data sources may comprise subcomponents of existing configuration management tools—e.g., in the depicted embodiment, a customer's configuration management database 167 comprises a data source 134G reporting to the service 104.

The configuration discovery service 104 may implement one or more sets of programmatic interfaces 150 in the depicted embodiment, any of which may comprise for example application programming interfaces (APIs), web-based consoles, command-line tools and/or graphical user interfaces. The client-facing programmatic interfaces 150A may, for example, be used by customers to identify and/or grant configuration data gathering permissions associated with their application execution environments 144, to query or view configuration information collected by service 104 (e.g., using a visualization service), to obtain notifications regarding events or conditions which may require client feedback, and so on. A set of data collection and/or service-side programmatic interfaces 150B may be used for interactions between CDCs 134 and the service 104 in the depicted embodiment.

In addition to the storage manager 108 and the query manager 109, in the depicted embodiment the configuration discovery service 104 may comprise one or more other subcomponents, such as component 110 responsible for coalescing/disambiguating raw configuration data as discussed below in further detail. The CDCs 134 may provide raw configuration data sets in a variety of formats and at different intervals to the configuration discovery service 104 in the depicted embodiment. In some cases, the raw data received at service 104 with respect to one or more configuration items 136 may be stale or out-of-date or inaccurate. Furthermore, the manner in which the configuration items are identified in the raw data sets provided by the different data sources 134 may in some cases be inconsistent—e.g., if a given hardware server configuration item has a plurality of IP addresses, the server may be referred to using different IP addresses by different configuration data sources, or by name or location (such as "server 5 of rack R1 in room 3 of data center DC1") by other data sources.

The configuration discovery service 104 may be responsible for consolidating, disambiguating and curating the raw configuration data sets using a variety of techniques in the depicted embodiment. In one such technique, when a set of raw configuration data is received, the service 104 may attempt to discern whether the data refers to a known configuration item 136 (an item for which configuration data has been received and recorded previously at the service). If the newly-received data does not appear to correspond to a known configuration item, a naming scheme or algorithm may be used to generate a unique service-side identifier for the configuration item to which the raw data corresponds, based at least in part on an ontology defined at the service 104 and/or on one or more attribute values of the configuration item which are indicated in the raw data. The unique service-side identifier may, at least in some implementations, differ from the identifier used by the data source in the raw data set. In effect, in such implementations, the service 104 may be responsible for maintaining mappings between data source-reported identifiers and the unique service-side identifiers. When subsequent raw data sets are received at the service, in some embodiments the coalescing/disambiguating components 110 may utilize such mappings and/or use correlations of the raw configuration data with previously-seen data to identify the configuration item to which the raw data sets apply. In some embodiments, the service-side identifier assigned to a given configuration item 136 may be unique within the entire collection of configuration records stored at the service 104, while in other embodiments, the identifier may be unique within a particular configuration domain or namespace (e.g., a domain or namespace associated with a given customer).

The manner in which available configuration data about a configuration item is analyzed and used to generate a unique service-side identifier may differ in different embodiments. In one embodiment, the raw configuration data, which may be provided in XML (Extensible Markup Language), JSON (JavaScript Object Notation), plain text or a binary format such as CBOR (Concise Binary Object Representation) by different data sources, may first be parsed and normalized into a common format. A search for attribute values provided for keywords (such as "IPAddr" for Internet Protocol Address or "MACAddr" for median access control addresses) that are associated with uniqueness within some namespace may be performed in the raw or normalized data, and the results of the search may be combined/concatenated with object type names (e.g., "database server" or "virtualization host") to generate the unique service-side identifier (e.g., "DBServer.<DBVendorName>.<IP address>"). In one embodiment, a machine learning technique may be used to improve the process of generating unique service-side names for configuration items. For example, a machine learning model for generating the identifiers may be trained using a large anonymized configuration data set collected from various components of a virtualized computing service of a provider network (e.g., the same provider network at which the configuration discovery service runs). Some of the naming decisions made by early versions of the model may be erroneous—e.g., the same underlying configuration item may be given two different unique identifiers, or two configuration items may be given the same identifier. Over time, as the model training progresses with larger input data sets, the error rate may be reduced.

In at least some embodiments, respective trust scores may be assigned to respective CDCs 134, and used to decide, in effect, which of two potentially conflicting sources is likely to be more accurate at a given point in time. For example, some of the CDCs may comprise agents of discovery service 104, which may have been designed, developed and tested by personnel of the operator of provider network 102B before being installed, while the origins and/or testing levels associated with other CDCs may be less well-known. In the latter scenario, a higher trust score may sometimes be assigned to the more familiar or better-understood data sources. In some embodiments, a trust score of a given data source may vary based on the attribute whose value is being considered, or the level of the software/hardware stack at which the attribute value was generated.

In addition to curating or consolidating raw configuration data received from the data sources 134, in at least some embodiments components of the discovery service 104 may perform a number of other functions, such as automatically identifying groups of configuration items which together correspond to a distributed application pattern, assigning roles within such groups to respective configuration items, implementing traffic source detection algorithms for network traffic whose sources may have been obfuscated by intermediary devices, proactively preparing configuration data to support high-performance querying, and so on.

Configuration Discovery Service Ontology

Figure 2:
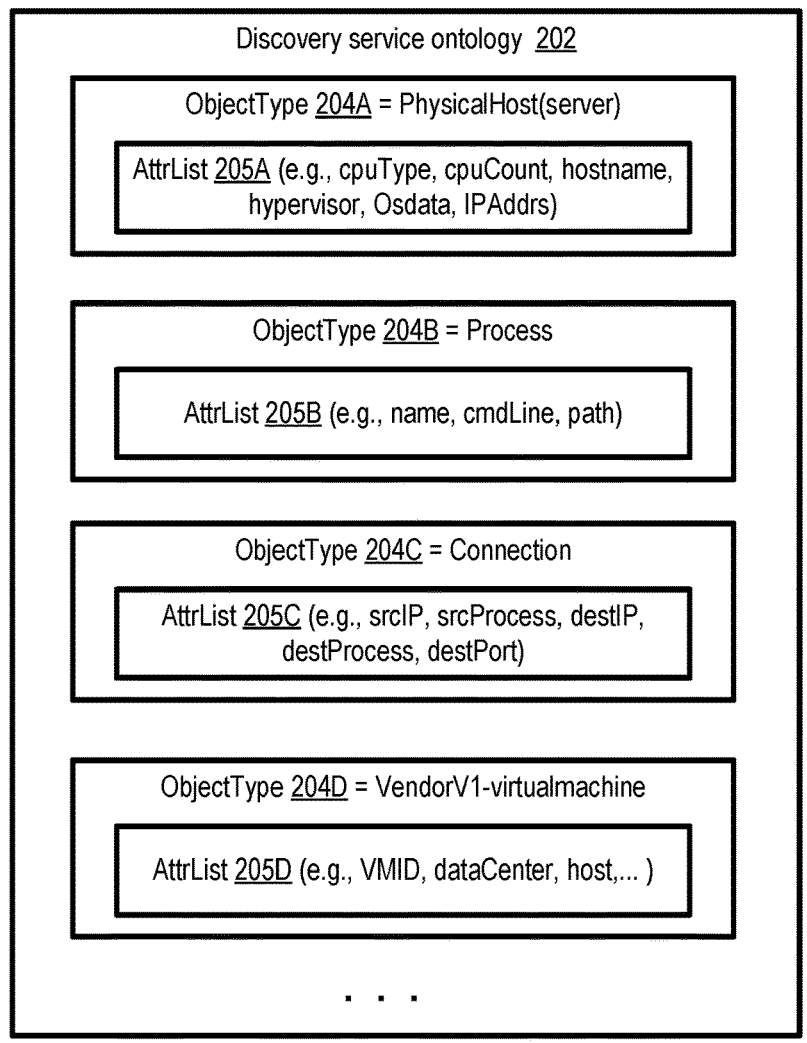
FIG. 2 illustrates example components of a discovery service ontology which may be used to organize configuration information, according to at least some embodiments.

As mentioned earlier, in at least some embodiments the configuration discovery service may define and utilize an ontology of configuration items. FIG. 2 illustrates example components of a discovery service ontology which may be used to organize configuration information, according to at least some embodiments. The ontology 202 may comprise a plurality of object types, and a list of one or more attributes corresponding to each object type in the depicted embodiments. Respective values for at least some of the attributes of a given attribute list for a given configuration item may be included in the raw configuration data sets transmitted to the configuration discovery service by various configuration data sources. The ontology and the raw attribute values may be use to generate unique service-side identifiers for configuration items in various embodiments. For example, a unique service-side identifier for a configuration item may be constructed by concatenating several attribute values (some of which may be obtained from different data sources) with a service-generated text identifier prefix in some embodiments.

Object type 204A, for example, corresponds to a physical host or server. The corresponding attribute list 205A may include the CPU type, the count of CPUs or cores, the currently-assigned host name, the hypervisor (if any is installed), various elements of operating system information (OSdata), one or more IP addresses, and the like. The value of a given attribute of an attribute list such as 205A may itself comprise several distinct elements of data—e.g., the "CPU type" attribute may include information about the instruction set architecture supported by the CPU, the CPU vendor, the CPU's clock frequency, model name and so on.

Object type 204B represents a process (i.e., a unit of execution at a server). Attribute lost 205B for the process may include, among others, the name of the process, the command line used to invoke the process, the path (e.g., directory path or folder path) at a host's operating system corresponding to the location of the executable used for the process and/or to the home directory of the process, the number of threads of the process, and so on.

Object type 204C represents a network connection (assumed to be established using the Transmission Control Protocol/Internet Protocol or TCP/IP suite in this example). Attribute list 205C comprises the source and destination IP addresses (srcIP and destIP respectively) (e.g., with the source being identified as the endpoint which issued the connect( ) call to establish the connection), the source and destination process identifiers (srcProcess and destProcess respectively) and/or the destination port (destPort).

Object type 204D corresponds to a virtual machine generated using a virtualization framework obtained from a particular technology vendor V1. The attribute list 205D for the virtual machine includes a vendor-defined virtual machine identifier (VMID), an identifier of the data center at which the virtual machine is running or has run, and the host at which the virtual machine is currently running, is scheduled to run, or has run.

A number of other object types may be defined in the ontology 202 in various embodiments. For example, respective object types may be defined for storage devices, entities such as database instances, networking device such as load balancers/routers etc. and the like in some embodiments. In one embodiment, respective object types may be defined for geographical or other groupings of resources—e.g., a data center may have its own object type, or a server rack may have its own object type. In some embodiments, the ontology may define hierarchical or containment relationships among various objects—for example, a number of processes may be running at a given host and may therefore be contained within the host, a master process of an application may spawn various other processes which may be designated as child processes of the master, and so on. Relationships among various entities of the ontology may be defined in an object-oriented manner in at least some implementations.

Example Storage Configuration Changes for Discovery Service Records

Figure 3:
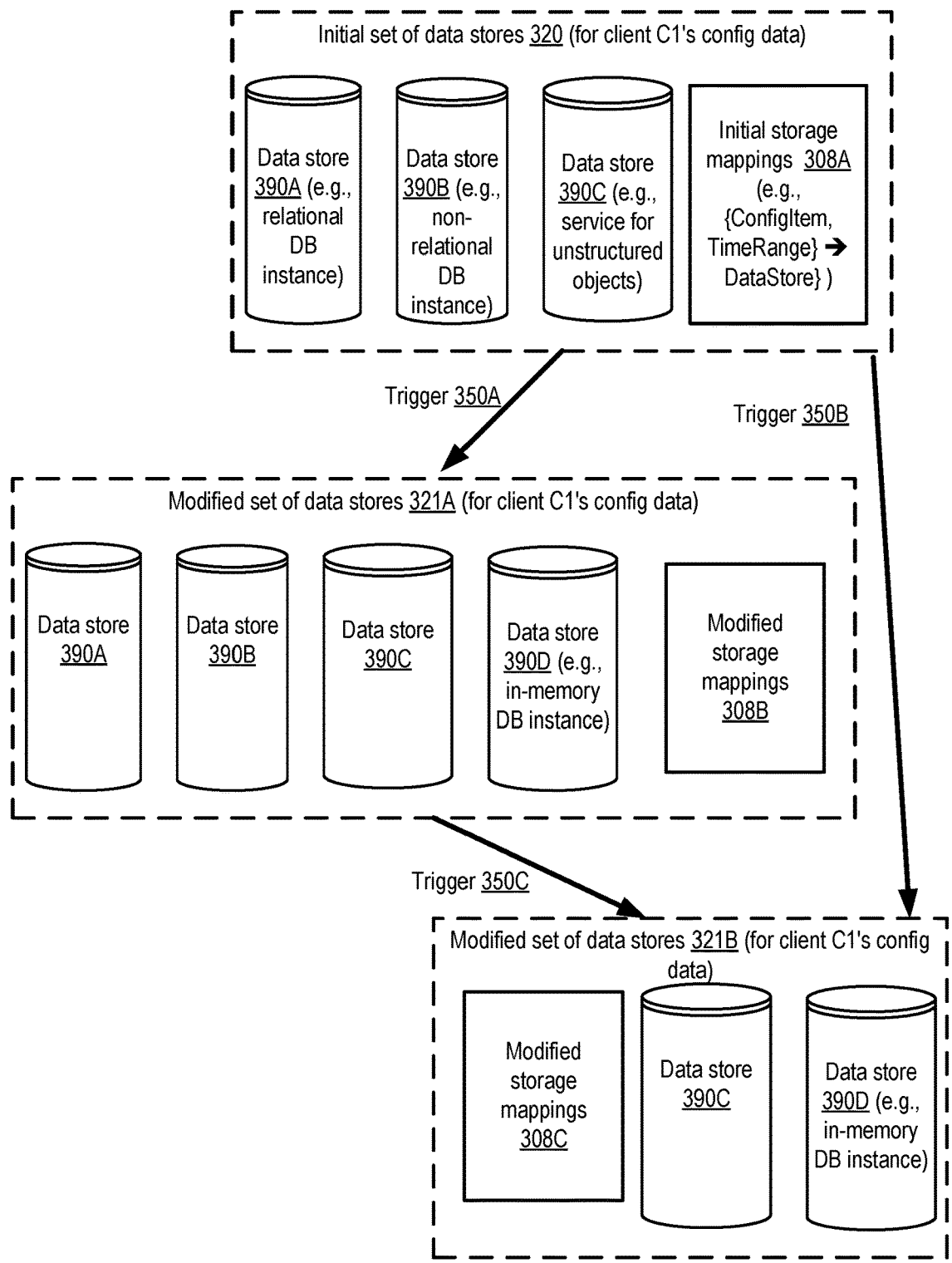
FIG. 3 illustrates examples of changes which may be made to the set of data stores being used for configuration data of a client, according to at least some embodiments.

FIG. 3 illustrates examples of changes which may be made to the set of data stores being used for configuration data of a client, according to at least some embodiments. As shown, the configuration discovery service may initially identify data store set 320 for client C1's configuration data in the depicted embodiment. An algorithm which may be used in some embodiments to determine the initial set of data stores is discussed below in the context of FIG. 8. Set 320 may include, for example, an instance 390A of a relational database, an instance 390B of a non-relational database, and one or more unstructured objects of a storage service 390C. Initial storage mappings 308A may indicate the distribution of configuration records for one or more of the compute environments of the customer C1 in the depicted embodiment. A given mapping 308A may, for example, in one implementation indicate the particular data store 390 at which configuration records of a given configuration item are stored during at least a particular time range. Thus, for example, one mapping may indicate that configuration records representing a particular physical server, collected and/or generated during a time interval between January 1 and January 31 of a particular year, are stored at non-relational database instance 390B. It is noted that in some embodiments, additional attributes other than the combination of configuration item identifier and time range shown in FIG. 3 may be used as the keys to be used to look up where configuration records are stored—e.g., values of different attributes of a given configuration item may be stored in separate data stores. Similarly, in one embodiment, the storage destination information in the mappings 308 may be indicated at a finer granularity than that shown in FIG. 3—e.g., the name of a table or a data object identifier may be used instead of the name or identifier of a data store. In some embodiments, the mappings 308 may be stored in a separate metadata repository of the configuration discovery service. In other embodiments, the mappings 308 may be replicated at one or more of the data stores 390 themselves. In at least one embodiment, a distributed approach towards the implementation of the mappings 308 may be used—for example, a gossip protocol or some other communication protocol may be used to exchange mapping information among various devices or components of the configuration discovery service. In one such embodiment, the mappings need not necessarily be stored at a data store.

In the depicted embodiment, various types of triggering conditions may lead to a change in the set of data stores used for C1's configuration records. For example, if trigger 350A is detected at the service, the set of data stores 320 may be modified by adding a fourth data store, in-memory database instance 390D, which may be used for at least some configuration records of some configuration items over a time period. Examples of factors which may contribute to data set change decisions in different embodiments are discussed below in the context of FIG. 6. Modified storage mappings 308B may be generated for the modified data store set 321B in the depicted embodiment. If trigger 350B is detected by the service while C1's configuration data is stored at data store set 320, a different modified set of data stores 321B may be used in the depicted embodiment, which may comprise only data stores 390C and 390D. If the trigger 350A leads to the set of data stores 321A, another trigger 350C may later lead to the use of modified data store set 321B in some embodiments. The changes from data store sets 320 or 321A to data store set 321B may, in some embodiments, involve the copying or migration of previously-stored configuration data from the data stores which are excluded from the new set 321B.

Figure 4:
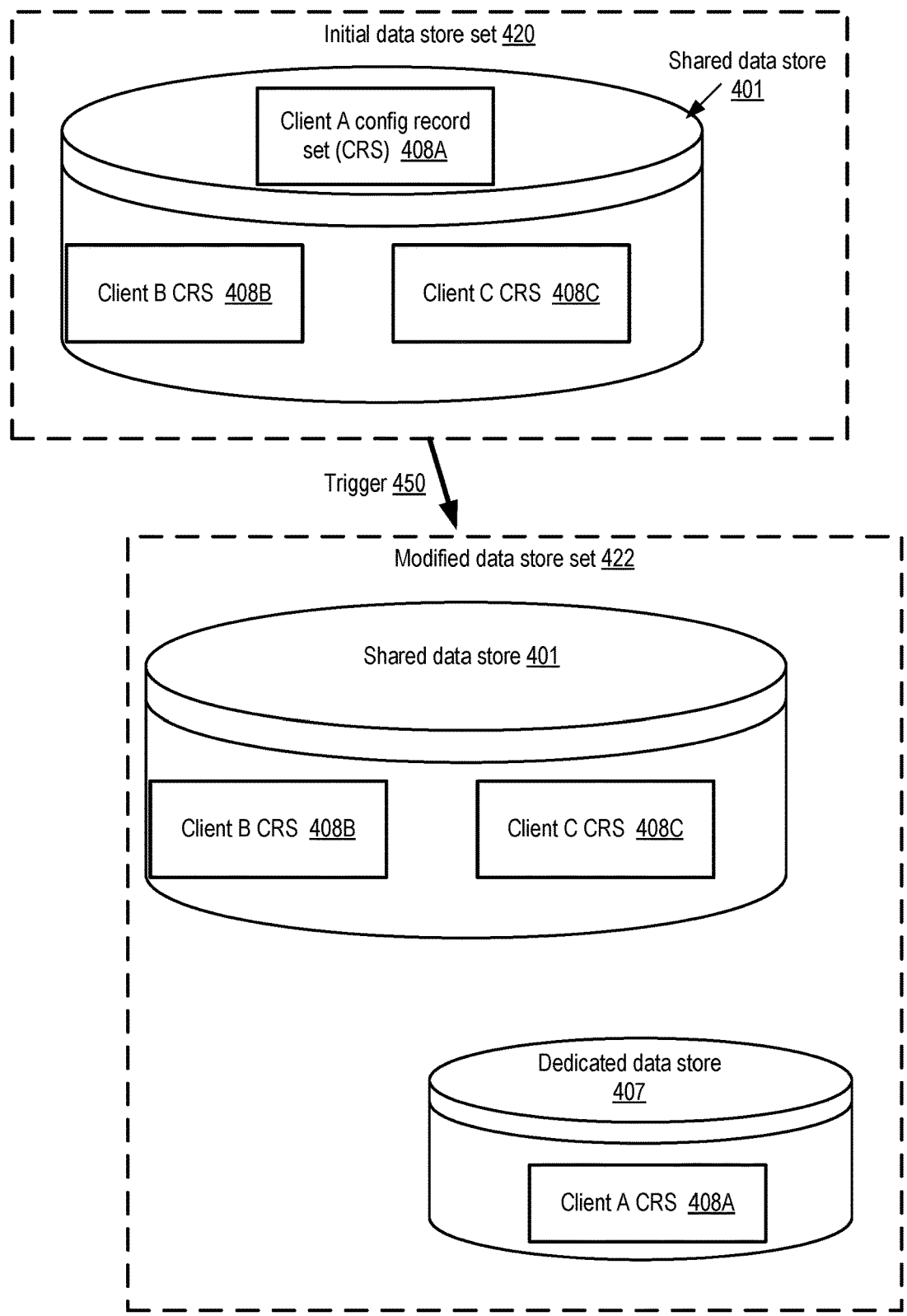
FIG. 4 illustrates an example of a use of a dedicated data store for configuration data of a client, according to at least some embodiments.

In some embodiments, some data stores may be used in a multi-tenant manner for storing configuration data of multiple clients of the configuration discovery service, while other data stores may be dedicated to the configuration data of a single client. FIG. 4 illustrates an example of a use of a dedicated data store for configuration data of a client, according to at least some embodiments. As shown, in a set of data stores 420, a single data store 401 may be used for respective configuration record sets (CRSs) of three clients for some time period: C1's CRS 408A, C2's CRS 408B, and C3's CRS 408C.

The configuration discovery service may detect a trigger 450, as a result of which at least a portion of CRS 408A may be transferred/migrated to a dedicated data store 407 in the depicted embodiment. The CRSs 408B and 408C may remain co-located, at least temporarily, at the shared data store 401. The trigger 450 which leads to the modified data store set 422 may, for example, comprise a detection by the configuration data service that C1's configuration data has reached a threshold size, or that the rate at which queries are directed to C1's configuration data may lead to unsatisfactory performance unless a dedicated data store is used for C1, or that C1 has submitted a request to isolate/secure C1's configuration data.

It is noted that in some embodiments, several other types of changes may be made with respect to storing clients' configuration records managed by a discovery service. For example, in one embodiment, data may be moved from one data store to another based on its age (time since the configuration data was first collected or processed). In such an embodiment, a first data store may be used, for example, for configuration records which are less than T days old, configuration records between T and k*T days old may be transferred to a second data store, configuration records more than k*T days old may be transferred to a third data store, and so on. In one implementation in which such age-based storage is used, background processes may be used to copy data from the first to the second data stores during the first T days of the data's lifetime, so that when a given configuration record reaches the age where it is no longer going to be available from the first data store, it is already present at the second data store and can simply be deleted or invalidated from the first data store. Similar background copying may be performed between the second and third data stores in one implementation. In another embodiment, configuration records may be compressed and/or encrypted when they are moved from one data store to another. In one embodiment, data store destinations may be chosen for configuration records based on the attributes whose values are being stored—for example, information pertaining to functional correctness of a configuration item may be stored in one data store, while information pertaining to performance may be stored in a different data store.

Query Management for Configuration Data

Figure 5:
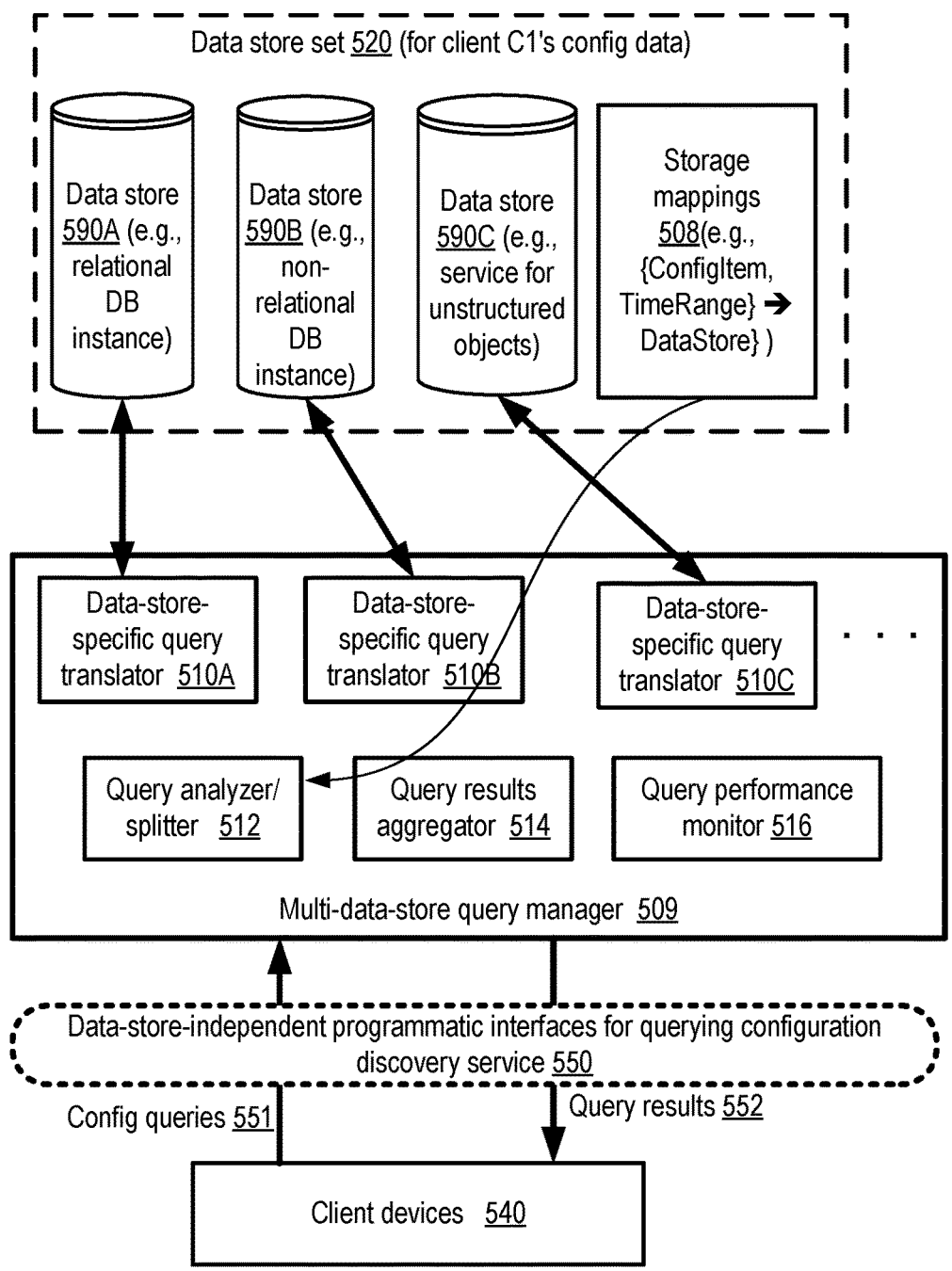
FIG. 5 illustrates an example of a multi-data store query manager used for responding to configuration queries, according to at least some embodiments.

FIG. 5 illustrates an example of a multi-data store query manager used for responding to configuration queries, according to at least some embodiments. As shown, the configuration discovery service may implement a set of data store independent programmatic interfaces 550. Clients may submit configuration queries 551 pertaining to their compute environments from a variety of client devices 540 using the data store independent interfaces 550, and receive 552 replies to those queries prepared at the multi-data store query manager 509. In at least some embodiments, requests submitted by a client via the data store independent interfaces 550 may also or instead result in the execution of batch jobs, and the results of those batch jobs may be provided to the clients via the interfaces 550 as well. The description provided below of the operations of the query manager 509 may apply to batch jobs as well as to queries in various embodiments—e.g., similar types of translations and aggregation functions may be implemented for batch jobs as for queries.

Data store set 520 used for a client C1's configuration records may comprise data stores 590A, 590B and 590C in the depicted embodiment. Data store 590A may, for example, comprise an instance of a relational database, data store 590B may comprise an instance of a non-relational (e.g., a NoSQL) database, and data store 590C may comprise a collection of unstructured data objects managed by a storage service of a provider network. As such, different query languages, query interfaces and/or data formats may be supported natively by the respective data stores 590 in the depicted embodiment. Upon receiving a query from a client, a query analyzer/splitter subcomponent 512 of the query manager 509 may determine, e.g., using the storage mappings 508, the set of data stores 590 at which the data to be used to satisfy the query are stored. For some queries, the data which has to be accessed to prepare a response may be spread over multiple data stores 590 in the depicted embodiment. For each data store 590 from which data is to be obtained to respond to the query, a respective sub-query or intermediate query may be prepared in the depicted embodiment by a corresponding data-store-specific query translator 510 (e.g., translator 510A for data store 590A, translator 510B for data store 590B, or translator 510C for data stores 590C). The results obtained from the individual data stores may be combined at a query results aggregator 514 in some embodiments, and the aggregated response may be provided to the client. In some embodiments, the query manager 509 may transform data from one format to another as needed, e.g., at the query translators or results aggregator.

In at least one embodiment, the multi data store query manager 509 may also include a query performance monitor 516. The performance monitor may track query response times, throughputs and/or other metrics in one embodiment, and compare the metrics before and after data store set changes to determine whether the user experience of the clients could have been affected negatively. If the performance of some set of monitored queries issued after a data store set has been changed deteriorates beyond a threshold (e.g., if the response time for a given kind of query is found to be S % longer than before the data store set was changed), in some embodiments the configuration discovery service may initiate a corrective action. The corrective action may comprise, for example, deploying more or faster resources to speed up the queries, undoing at least some of the data store changes for some configuration items, and so on. In some embodiments, a monitoring service of a provider network may be used to monitor query performance, for example, instead of or in addition to a performance monitor 516 implemented within the configuration discovery service itself.

Example Factors Influencing Data Store Changes

Figure 6:
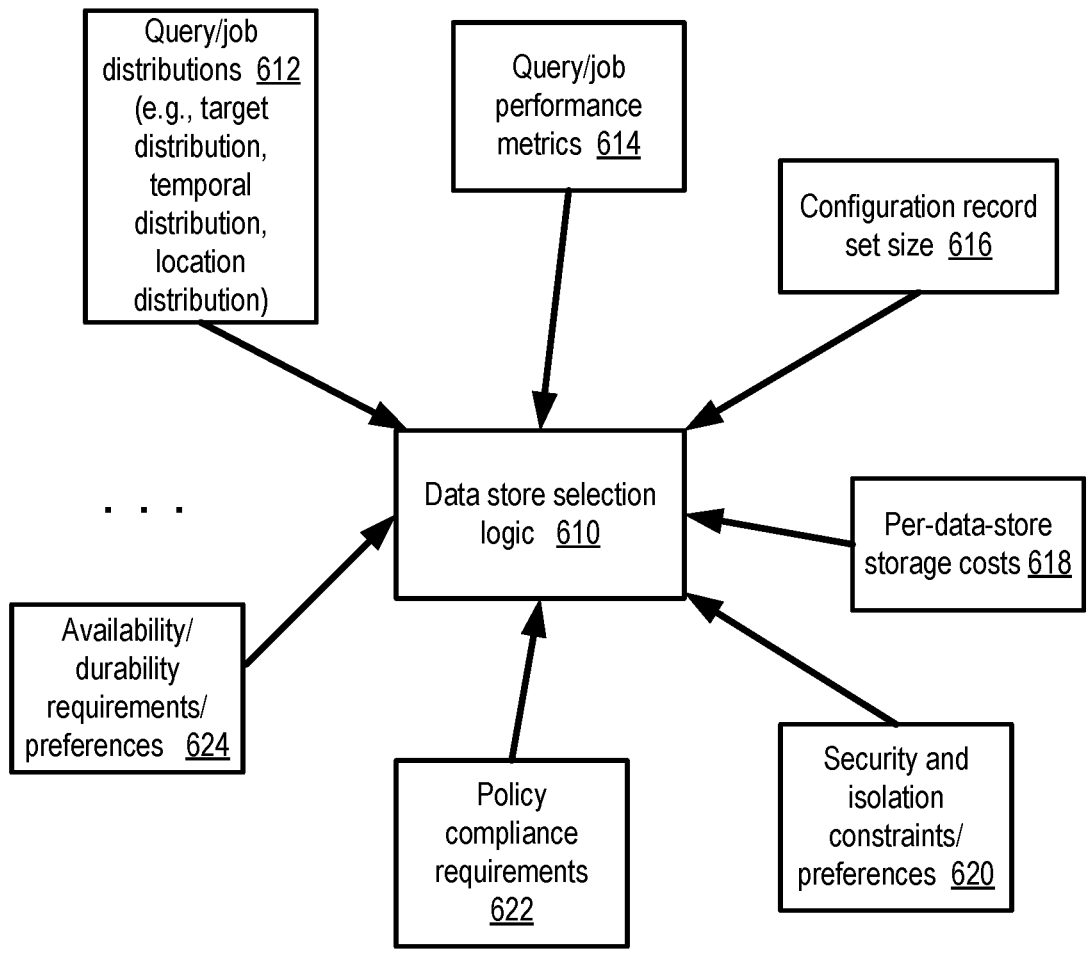
FIG. 6 illustrates examples of factors which may trigger changes with respect to storage destinations of a client's configuration data, according to at least some embodiments.

FIG. 6 illustrates examples of factors which may trigger changes with respect to storage destinations of a client's configuration data, according to at least some embodiments. The configuration discovery service may analyze the distributions 612, along one or more dimensions, of queries and/or batch jobs directed to the discovered configuration data in the depicted embodiment. The dimensions considered may include, for example, target distribution, temporal distribution, location distribution, and so on. The distribution of queries/jobs with respect to targets may indicate, for example, whether some subsets of configuration records or configuration items are targeted more often by client requests than others. The temporal distribution may reveal if and how the age of configuration records (how long it has been since the records were processed or collected) influences the rate at which the records are queried or analyzed in response to customer requests, whether there are any particular times of the days or days of the week which correlated to higher query rates than others, and so on. In some embodiments in which the configuration records are collected from numerous different physical or geographical locations, the distribution of queries and/or jobs with respect to the different locations may be analyzed. Using such analysis, the data store selection logic 610 may be able to identify various subsets or age-based characteristics of the configuration records which may be appropriate for transfer to faster or slower data stores in some embodiments.

Measured query and/or batch job performance metrics 614 may be used, for example, to determine whether some of the configuration data should be transferred to destinations (such as in-memory data stores) which can support faster response times in the depicted embodiment. Alternatively, if the query/job response times using the current set of data stores are so short that slightly longer response times may be acceptable to end users, some of the configuration data may be transferred to destinations which may be cheaper per unit of storage while providing slightly slower access times.

The aggregate size 616 of the configuration record set of a given client or a given compute environment may also influence data set change decisions in some embodiments. For example, as the amount of data stored for a given client grows, it may eventually become cost prohibitive to retain the entire data set within the initially-selected set of data stores. The per data store storage costs 618 may influence destination decisions in some embodiments. In one embodiment, for example, it may make sense to transfer at least some of the configuration data of a client which is not expected to be accessed vey frequently to a data store which has a lower per-storage-unit cost.

Security and isolation constraints and preferences 620 may also influence the kids of data stores at which various configuration records are stored in some embodiments. For example, some subsets of configuration data may be considered more sensitive from the client's perspective, and may therefore be stored in dedicated data stores, e.g., in encrypted form. In some embodiments, configuration data may be collected from several different organizational units (e.g., departments, subsidiary business entities, etc.) associated with a given customer, and the security or isolation requirements may differ from one organizational unit to another, resulting in the selection of different destinations for the configuration records generated for respective organization units. In one embodiment, isolated virtual networks (which may also be referred to as virtual private clouds) may be established at a provider network for a client. An isolated virtual network may comprise a collection of networked resources (e.g., virtual machines, storage resources and the like) associated with a customer account identifier, to which network access is restricted from resources of other clients or customers. Within a given isolated virtual network set up for a client, the client may be granted substantial flexibility regarding networking configuration choices, such as the assignment of private IP (Internet protocol) addresses, subnet configurations, security rules governing incoming and outgoing traffic, and so on. In one embodiment, a client of the configuration discovery service may, for example, request that their configuration records be stored within storage resources of an isolated virtual network allocated to the client's customer account. For example, a data store preference comprising a directive to store configuration data meeting a specified criterion (e.g., configuration data associated with a particular application which has an associated security constraint) at a storage resource allocated to a client account of a provider network may be received from such a client, and the service may take the actions needed to satisfy the expressed preference.

For some kinds of configuration data in some legal jurisdictions, policy compliance requirements 622 (e.g., applicable laws or regulations) may influence the kinds of data stores to be used. In one embodiment, clients may have availability or data durability requirements 624 for at least some of their configuration records, which may influence the data stores selected. In various embodiments, at least some of the decisions regarding data store destinations for a client's configuration data may be based at least in part on indications of data store preferences of the clients, which may be received at the configuration discovery service via programmatic interfaces. Factors other than those shown in FIG. 6 may influence destination data store selections in at least some embodiments. It is noted that the kinds of factors discussed in the context of FIG. 6 may be used in some embodiments to generate dynamic storage requirement profiles for a variety of applications and/or services at a provider network, and the use of such factors to make changes regarding storage destinations may not be limited to configuration records of a discovery service.

Coalesced and Curated Configuration Records

Figure 7:
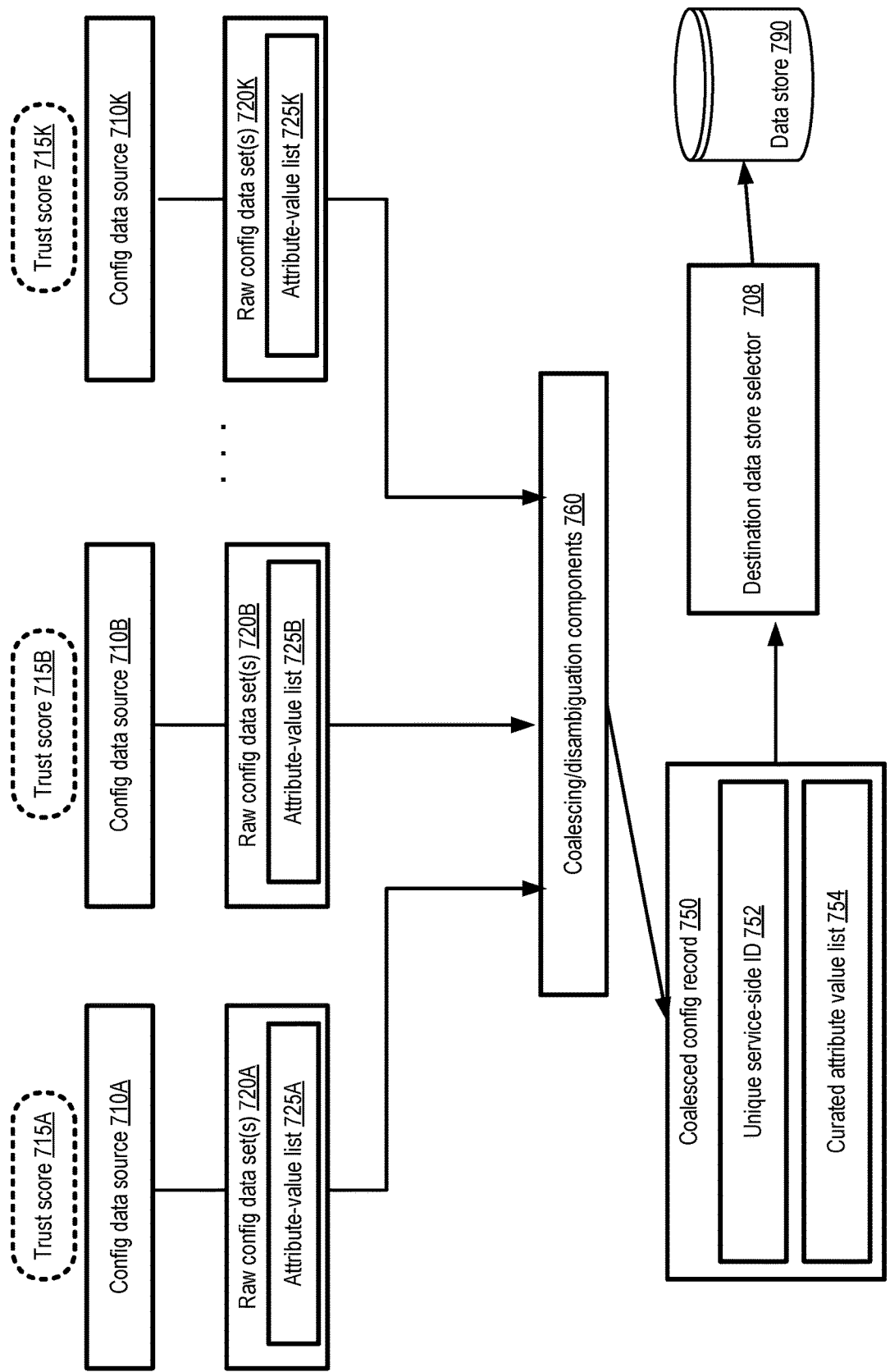
FIG. 7 illustrates an example of coalescing raw configuration information from a plurality of data sources with respective trust scores to produce a curated attribute-value list, according to at least some embodiments.

As mentioned earlier, in at least some embodiments the configuration discovery service may collect configuration data pertaining to a given resource or configuration item from a variety of sources (e.g., via configuration data collectors discussed in the context of FIG. 1) with different degrees of reliability, and analyzing the collected data to produce consistent configuration records. FIG. 7 illustrates an example of coalescing raw configuration information from a plurality of sources with respective trust scores to produce a curated attribute-value list, according to at least some embodiments. In the depicted embodiment, a plurality of raw configuration data sets 720, including data sets 720A, 720B, and 720K pertaining to a given configuration item are transmitted to a discovery service by respective data sources 710 (e.g., data sources 710A, 710B and 710K). Each raw configuration data set 720 comprises a respective attribute value list 725. For a given host, for example, the attributes and their corresponding values may include "Name: Host100", "IP Address:a.b.c.d", "operating system: <OSVersion>" and so on. Not all the attribute values may necessarily correspond to a single configuration item in at least some embodiments—e.g., one or more of the configuration data sources may be reporting on a plurality of configuration items. Different data sets 720 may represent different levels of granularity—for example, one data set may include application-level information such as the number of database transactions issued or received, while another may include lower-level details such as the number of network packets transmitted or received. Some of the raw configuration data sent by two different data sources may correspond to different times—e.g., data set 720A may have been collected at a different time than data set 720K. In some cases, two or more of the attribute values pertaining to a given configuration item may conflict with one another—for example, it may be the case that one data set indicates that a particular process with a process identifier PID1 at one host H1 was responsible for communicating with a different host, while another data set may indicate that a process with another process identifier PID2 was responsible for such communications. In some embodiments, at least some of the configuration data sources may generate respective identifiers for the configuration items for which they provide data to the discovery service, and include these identifiers in data sets 720. Such identifiers may be referred to as data-source-side identifiers to distinguish them from the identifiers generated by the discovery service. Two data sources may sometimes refer to the same underlying configuration item using distinct data-source-side identifiers—e.g., one data source may refer to a host by name (e.g., "hostK.<domainname>"), another may refer to the same host by IP address, and another by function (e.g., "database server DBS1").

The coalescing/disambiguating components 760 of the configuration discovery service may examine and process all the raw configuration data sets 720 and update (or create) a respective coalesced configuration record 750 corresponding to one or more configuration items whose raw data is included in the data sets 720 in the depicted embodiment. An algorithm that may be used to coalesce two raw configuration data sets from two different sources may comprise at least some of the following steps in one embodiment. First, a decision as to whether each of the data sets comprises attribute values pertaining to the same type of configuration item (such as host, process, virtual machine etc., which are defined as ObjectTypes in the ontology 202 of FIG. 2) may be made. In order to do so, in some embodiments the attribute names may be compared to the attribute lists (e.g., AttrLists 205 of FIG. 2) defined for various configuration items in the discovery service's ontology. The attribute lists may indicate synonyms in some cases—e.g., the same attribute name be identified via name AttrName1 by one data source and AttrName2 by another data source. If it is determined that both data sets contain at least some attribute values pertaining to the same configuration item type, those <attribute:value> pairs may be examined for correlations, matches or duplications. For example, if both data sets indicate that (a) the CPU utilization at a host was approximately 75% during a particular time interval, (b) and that 2500 UDP packets were sent during the time interval from that host, this might be interpreted as an indication that the data sets are referring to the same host, even if different data-source side identifiers were used for the same host. If such a match is detected (with some minimum confidence level), a decision to create a single coalesced record for the host may be taken; otherwise, the two data sets may be deemed to refer to two different hosts and separate coalesced records may be generated. Within the single coalesced record, some subset of the <attribute:value> pairs taken from one or both the data sets may be incorporated. For example, redundant/duplicated attribute values may be discarded, some attribute values may not be included in the coalesced record because the information they contain is deducible from other attribute values that are included, or because a more accurate data source for the same data is known. Depending on the kind of data included in the data sets, in some cases one or more elements or attribute values of an existing coalesced configuration record may be updated (or new attributes added to an existing coalesced configuration record) instead of generating a new coalesced configuration record.

The coalesced configuration record 750 may often provide a more complete characterization of the configuration item than would have been possible from any single raw configuration data set 720. A coalesced configuration record 750 may include a unique service-side identifier 752 for the configuration item, which may differ from respective data-source-side identifiers indicated in the raw data sets 720 in the depicted embodiment, and may be generated based at least in part on the configuration discovery service's ontology and/or on elements of the raw configuration data sets. In at least some embodiments, a coalesced configuration record 750 may comprise a curated attribute value list 754 which may not necessarily include the union of all the attribute value lists 725 pertaining to the configuration item. Instead, for example, the coalescing/disambiguation components may discard some attribute values from one or more data sources because the values are stale (e.g., because the values have been superseded by newer values for the same underlying attributes obtained from other sources, or simply because the difference between the time that the values were collected and the time that the values are being processed exceeds a threshold). In some embodiments, respective trust scores 715 (e.g., scores 715A-715K) of the different data sources may also or instead be used to determine whether a given attribute value is to be included in the coalesced configuration record. The trust scores may be especially useful when two different data sources provide raw data corresponding to the same attribute: in such a scenario, the attribute value provided by the source with the higher trust score may take precedence. In some embodiments in which each raw data set 720 has an associated timestamp indicating when the data was collected, a formula which takes both the timestamps and the trust scores into account (in effect, resulting in time-weighted trust scores) may be used to select which attributes should be included in the curated attributed value list 754.

In some embodiments, if and when the configuration item to which a given item or items within a raw data set 720 pertain is unclear, the coalescing/disambiguating components 760 of the configuration discovery service may utilize a pattern-matching approach to identify the configuration item. For example, consider a simple scenario in which raw data set 720B and 720K both report on approximate outbound network traffic over a given time interval for some configuration item, and that data set 720B includes a host name of the configuration item but data set 720K does not. In this trivial example scenario, the coalescing/disambiguating components 760 may attempt to find attribute values contained in data set 720K which match attribute values in other data sets for similar time periods. If the outbound network traffic rates match between data sets 720K and 720B to some threshold level of precision or accuracy, the two data sets (in the absence of any contradicting evidence) may be assumed to refer to the same underlying configuration item.

After a given coalesced configuration record 750 is generated for a configuration item, the particular back end data store 790 to be used for the record may be identified in the depicted embodiment, e.g., by a destination data store selector component 708 of the discovery service. The destination data store selector 708 may, for example, take some or all of the factors discussed in the context of FIG. 6 into account to identify the appropriate data store. The coalesced record 750 may be transmitted to the appropriate data store via the write/update programmatic interfaces of the data store, and the storage mappings for the corresponding configuration item may be updated if needed in at least some embodiments.

Methods for Dynamic Storage Management of Configuration Data

Figure 8:
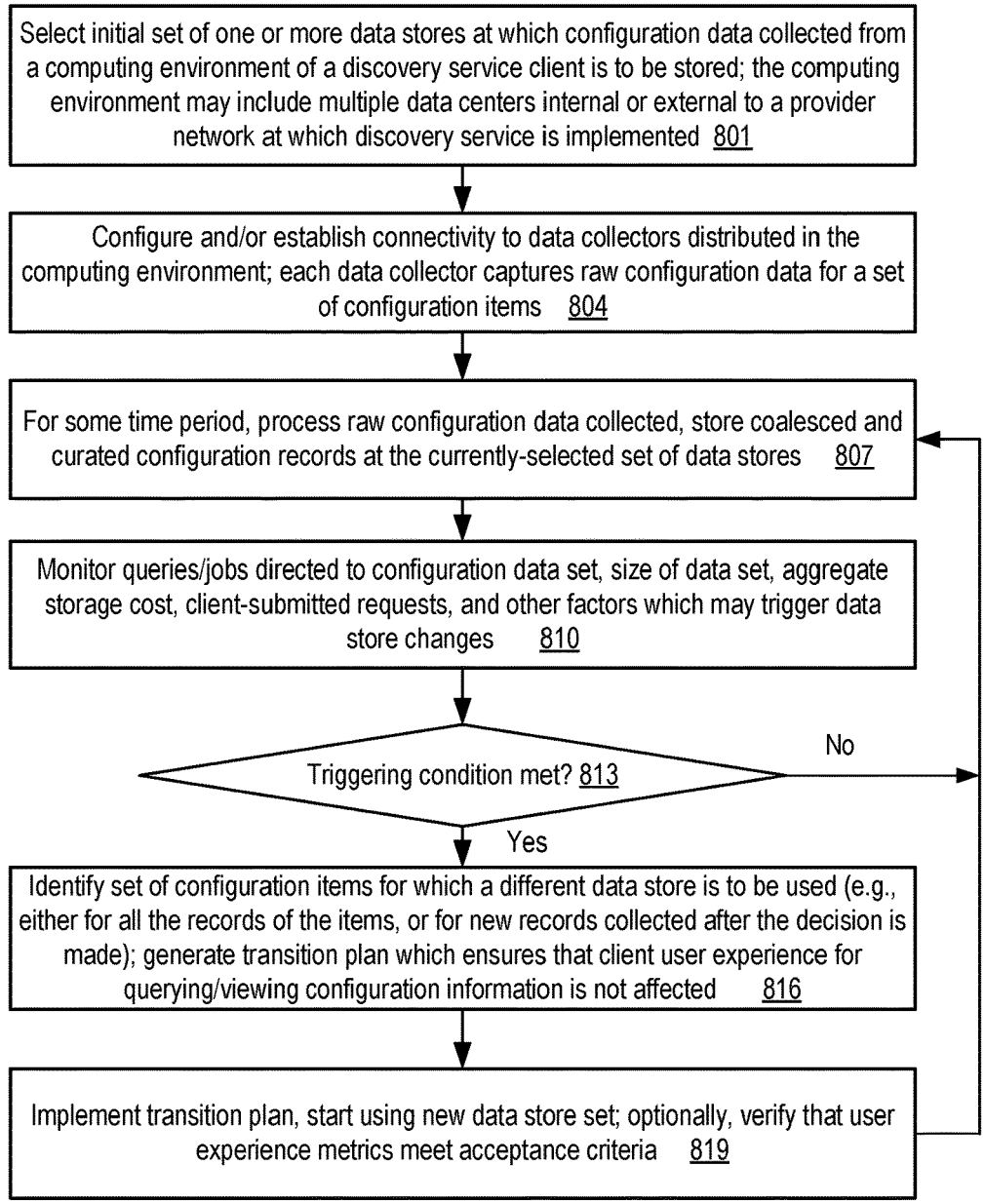
FIG. 8 is a flow diagram illustrating aspects of storage management operations that may be performed at a configuration discovery service, according to at least some embodiments.

FIG. 8 is a flow diagram illustrating aspects of storage management operations that may be performed at a configuration discovery service, according to at least some embodiments. As shown in element 801, an initial set of one or more data stores at which configuration information associated with a computing environment of a client of a configuration discovery service is to be stored may be identified. The computing environment may, for example, comprise portions of one or more data centers, some of which may be part of a provider network at which the configuration discovery service is implemented, while others may be external to the provider network—e.g., some of the resources for which configuration data is to be collected on behalf of the client may be in a different provider network or in customer-owned or customer-managed premises.

According to one embodiment, an algorithm similar to the following may be used to select the initial set of data stores, e.g., at or before the time that collection of configuration data on behalf of the client is initiated by the discovery service. First, an estimate of the amount of configuration data that is going to be collected on behalf of the client, at least over some period of time, may be made. For example, the client may indicate an approximate number of hardware servers, software applications and/or devices from which data is to be collected, and this information may be used to generate the estimate. Next, a determination may be made as to whether some portion of the client's configuration record require a different level of security than the remainder, or whether some portion of the client's configuration data is likely to be queried at a higher rate or with shorter response time requirements than other portions. Such a determination may be made, in some embodiments, for example, based on programmatic requests or preferences submitted by the client, or based on knowledge base entries derived from experiences with other clients' computing environments. If there are some portions of the client's configuration data that require special treatment with respect to security or performance, destination data stores that are capable of providing the special treatment may be identified for those portions, while a default data store may be chosen for the remainder of the client's configuration data in some embodiments. In one embodiment, a tiered approach may be taken with respect to storing the client's configuration data even if no special security or performance requirements or preferences are identified. For example, a first data store DS1 which can support faster access times may be chosen for the configuration data collected within a selected time period prior to the present, while a second data store DS2 which may support slightly slower access times but have a lower cost per gigabyte may be chosen as the destination for configuration data which was collected earlier.

Configuration data collectors may be configured for the client's computing environment if they have not already been set up (element 804), and connectivity to such collectors may be established from the configuration discovery service if needed. Each data collector may be configured to collect raw configuration data at some frequency or based on some triggering conditions from one or more configuration items, and transmit the data to the configuration discovery service in the depicted embodiment. In some embodiments, a preliminary level of data cleansing may be performed at the data collectors prior to transmission of the data to the service. In one embodiment, a configuration data collector may comprise one or more processes instantiated at one or more hosts of the computing environment on behalf of the configuration discovery service. The data collectors may be launched and may start transferring configuration data to the discovery service in the depicted embodiment.

For some time period, the configuration data provided by the collectors may be analyzed and processed (element 807), e.g., at coalescing/disambiguation components of the configuration discovery service, to generate curated configuration records with service-generated identifiers using techniques similar to those discussed above. The curated configuration records may be stored at the initial set of data stores in the depicted embodiment. Clients may begin submitting queries to view various portions of the configuration information collected and generated on their behalf, e.g., using a data store independent query language supported by the discovery service as discussed above. Depending on the data subset targeted by a given query, the appropriate data store-specific queries may be generated internally by a query manager of the discovery service in various embodiments, transmitted to the corresponding data store, and the results of the per-data-store queries may be aggregated to respond to the clients.

In the depicted embodiment, the configuration discovery service may monitor the kinds of processing operations being performed on the configuration records in response to submitted client requests. Such processing operations may include, for example, relatively short queries as well as longer batch jobs in some embodiments. The distributions of the queries and/or batch jobs (e.g., with respect to the times at which the configuration data was collected, the times at which the client requests are received, the sets of configuration items targeted more frequently in the queries/jobs, etc.), the aggregate size of the data being stored for each client, and/or various other factors of the kinds discussed earlier which may influence decisions to change the set of data stores being used for a given client's configuration records (element 810). In one embodiments, a decision may be made periodically (e.g., once every day or every hour) as to whether the current set of data stores being used should continue to be used, or whether a triggering condition has been met which would result in changes to the data store set. In some embodiments, an algorithm similar to the following may be used to make data store change decisions. A relative priority may be assigned to the various factors to be considered: e.g., the highest priority may be assigned to explicit requests from clients regarding security or isolation of portions of their configuration data, a slightly lower priority may be assigned to transferring configuration data if/when a given client's configuration records collectively consume a targeted maximum storage space, and so on. In addition, default timings of successive data store change decisions and the collection of input data for the decisions with respect to a given client's configuration data may be determined— e.g., whether the factors to be considered are to be examined once every day, once every hour, etc. Then, in such an embodiment, a storage manager component of the discovery service may, in effect, wake up periodically in accordance with the timing decisions, and examine the data collected corresponding to the selected factors in priority order. If any of the data collected results in a decision to change a destination data store, the specific operations to be initiated may be identified as discussed below. If no change to a destination data store is needed, the storage manager may wait till the next scheduled analysis time and re-examine the data collected up to that time. In at least one embodiment, the issuance of an explicit client request may override the default schedule regarding potential data store change decisions—e.g., if a client request to secure some portion or all of their configuration data is received, that request may be fulfilled fairly quickly regardless of the default schedule.

If a triggering condition is detected (element 813), a set of configuration items whose destination data store is to be changed may be identified in the depicted embodiment (element 816). In some cases, the change may be applicable to all of the client's configuration items, while in other cases the change may apply to a subset of the client's configuration items. The particular data store to which configuration records of individual ones of the configuration items are to be directed may be identified. For example, for some configuration items which are targeted by frequent client queries, a data store that provides faster access response times than the one currently being used may be selected in one embodiment, while for other configuration items which are not queried very frequently, a data store that has a cheaper per-unit storage cost may be identified. A decision as to whether already-stored configuration records of a selected configuration item should be moved to the new destination data stores, or whether only configuration records generated after the new destination data store has been identified should be directed there, may be made in the depicted embodiment. A transition plan may be generated in at least some embodiments for the configuration items whose destination data store is changing, e.g., in an attempt to ensure that the user experience of the client with respect to querying/viewing their configuration information is not affected negatively by the change. For example, if some configuration records are to be moved from one data store to another, the transfer or copying may be performed as a background process in some embodiments, so that incoming queries received from clients during the transition can be handled as foreground high priority tasks from the original data store instead of being delayed or slowed down. In some embodiments, instead of or in addition to changing the destination data stores to which configuration data is directed based on various factors such as those discussed above, the discovery service may use similar factors to change the subset of data stores which are accessed to perform operations on behalf of clients (e.g., to respond to queries, or to execute batch jobs). Thus, for example, if data stores DS1, DS2 and DS3 are being used to store configuration records of a given customer, at some point of time the configuration service may stop accessing the records stored at DS1 in response to certain types of queries, and focus only on DS2 and DS3.

The transition plan may be implemented, and the use of the new set of data stores may be initiated for the configuration records of the client (element 819). In some embodiments, measurements of user experience metrics may optionally be obtained before and after the storage configuration for the back end data stores is changed, e.g., to verify that the change has not had a negative impact. If a negative impact is detected, corrective actions may be taken in at least some embodiments by the configuration discovery service, e.g., by adding more or faster resources to respond to the client's queries, or by un-doing the changes to the data stores. If, in operations corresponding to element 813, no trigger is detected, the use of the current set of data stores may continue in the depicted embodiment. The raw configuration records may be collected and analyzed for an additional time period, and the operations corresponding to elements 807 onwards may be repeated.

It is noted that in various embodiments, at least some operations other than those illustrated in the flow diagram of FIG. 8 may be used to implement the configuration discovery service-related techniques described above. Some of the operations shown may not be implemented in some embodiments or may be implemented in a different order, or in parallel rather than sequentially.

Use Cases

The techniques described above, of the dynamic modification of data stores used for storing client configuration data from a variety of sources at multiple networks, may be useful in a variety of embodiments. For complex application stacks distributed among customer-owned and provider-owned resources, the described configuration discovery service may be able to combine and curate application configuration data from diverse sources with varying levels of granularity, trust and accuracy. The service may expose the collected data, organized according to a standardized ontology-based naming schema, via easy-to-use programmatic interfaces including APIs that can be used to build higher-level services, such as services that help customers plan and implement the migration of their applications to provider network environments. By modifying the set of back end data stores used for client configuration data, varying client needs regarding query performance, data isolation and security may be satisfied.

Illustrative Computer System

Figure 9:
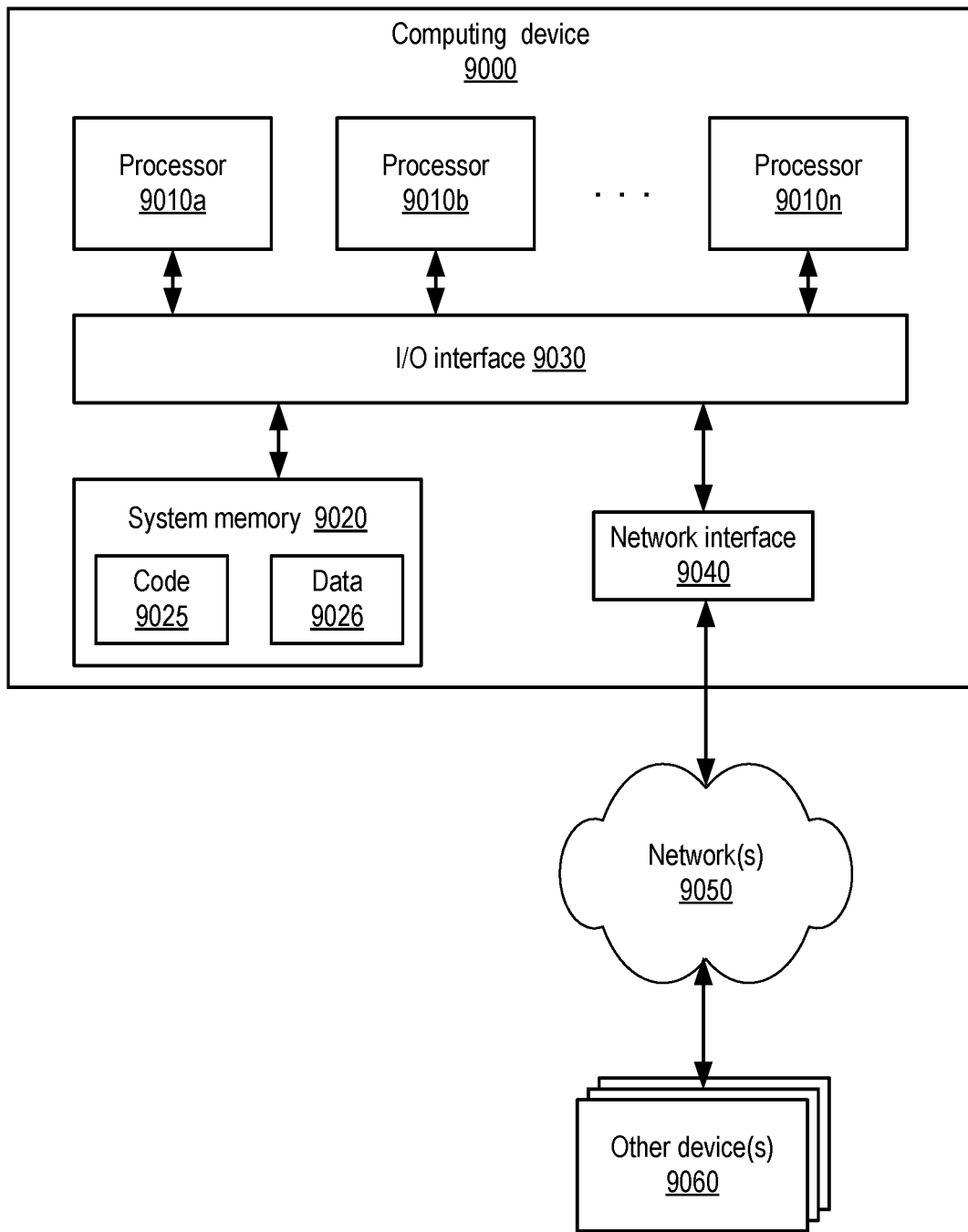
FIG. 9 is a block diagram illustrating an example computing device that may be used in at least some embodiments.

In at least some embodiments, a server that implements a portion or all of one or more of the technologies described herein, including the techniques to implement components of the configuration discovery service and associated data stores may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. Further, a computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of a network-accessible configuration discovery service;
wherein the one or more computing devices include instructions that when executed on a processor cause the one or more computing devices to:
select an initial set of data stores at which at least a portion of configuration data collected from a computing environment associated with a particular client is to be stored, wherein the initial set comprises at least a first instance of a relational database and at least a first instance of a non-relational database, and wherein the computing environment comprises a plurality of data centers;
store configuration data, collected from a plurality of configuration items identified in the computing environment, at the initial set of data stores for at least a particular time period, wherein the plurality of configuration items comprises a plurality of resources used for one or more applications;
based at least in part on (a) an analysis of one or more operations performed for the particular client on the configuration data collected from the resources and stored at the initial set of data stores and (b) a size metric of the configuration data collected from the resources, identify, from among the plurality of configuration items identified in the computing environment associated with the particular client, a particular configuration item as a candidate for a data store change from a first data store to a different data store for storage of additional configuration data of the particular configuration item subsequently collected from the particular configuration item, wherein the configuration data previously collected from the particular configuration item was stored at the first data store of the initial set of data stores in the particular time period;
subsequent to the identification of the particular configuration item as a candidate for a data store change from the first data store to a different data store for storage of additional configuration data subsequently collected from the particular configuration item, initiate storing of at least some of the additional configuration data subsequently collected from the particular configuration item at a second data store instead of the first data store in which the configuration data previously collected from the particular configuration item was stored; and
verify, after initiating the storing, that a user experience metric of an additional operation performed for the particular client meets an acceptance criterion.

2. The system as recited in claim 1, wherein a particular operation of the one or more operations comprises one or more of: (a) a batch-mode job or (b) generation of a response to a query directed to one or more configuration items of the plurality of configuration items.

3. The system as recited in claim 1, wherein the one or more computing devices include instructions that when executed on a processor cause the one or more computing devices to:
in response to receiving a particular query from the particular client,
determine that configuration data pertaining to the particular query is stored at a plurality of data stores, including a first data store with a first query language and a second data store with a second query language;
generate, based at least in part on the particular query, a first intermediate query in the first query language, and a second intermediate query in the second query language;
transmit an aggregated response to the particular query, wherein the aggregated response is based at least in part on (a) a first intermediate response obtained from the first data store, corresponding to the first intermediate query and (b) a second intermediate response obtained from the second data store, corresponding to the first intermediate query.

4. The system as recited in claim 1, wherein the one or more computing devices include instructions that when executed on a processor cause the one or more computing devices to:
determine a security constraint associated with configuration data pertaining to a second configuration item of the plurality of configuration items; and
select a data store at which the configuration data pertaining to the second configuration item is to be stored, based at least in part on the security constraint.

5. The system as recited in claim 1, wherein the one or more computing devices include instructions that when executed on a processor cause the one or more computing devices to:
receive, via a programmatic interface, an indication of a data store preference of the particular client; and
selecting at least one data store of the initial set based at least in part on the data store preference.

6. The system as recited in claim 1, wherein the computing environment comprises a first set of resources of a provider network, and a second set of resources located in a data center external to the provider network.

7. A method, comprising:
performing, by one or more computing devices:
selecting an initial set of one or more data stores at which at least a portion of configuration data collected at a configuration discovery service from a computing environment associated with a first client is to be stored;
storing, at the initial set of data stores for at least a first time period, configuration data pertaining to a plurality of configuration items identified in the computing environment, wherein the plurality of configuration items comprises a plurality of resources used for one or more applications;
based at least in part on an analysis of one or more operations performed for the first client on the configuration data pertaining to the resources stored at the initial set of data stores, identifying, from among the plurality of configuration items identified in the computing environment associated with the first client, a first configuration item as a candidate for a data store change from a first data store to a different data store for storage of additional configuration data of the first configuration item subsequently collected from the first configuration item, wherein the configuration data previously collected from the first configuration item was stored at the first data store of the initial set of data stores in the first time period; and subsequent to the identification of the first configuration item as a candidate for a data store change from the first data store to a different data store for storage of additional configuration data subsequently collected from the first configuration item, initiating storing of at least some of the additional configuration data subsequently collected from the first configuration item at a second data store instead of the first data store in which the configuration data previously collected from the first configuration item was stored.

8. The method as recited in claim 7, further comprising performing, by the one or more computing devices:

in response to receiving a particular query from the first client, determining that configuration data pertaining to the particular query is stored at a plurality of data stores, including a first data store with a first query language and a second data store with a second query language;

generating, based at least in part on the particular query, a first intermediate query in the first query language, and a second intermediate query in the second query language;

transmitting an aggregated response to the particular query, wherein the aggregated response is based at least in part on (a) a first intermediate response obtained from the first data store, corresponding to the first intermediate query and (b) a second intermediate response obtained from the second data store, corresponding to the second intermediate query.

9. The method as recited in claim 7, further comprising performing, by the one or more computing devices:

identifying a security constraint associated with configuration data pertaining to a second configuration item of the plurality of configuration items; and selecting a data store at which the configuration data pertaining to the second configuration item is to be stored, based at least in part on the security constraint.

10. The method as recited in claim 7, wherein said storing of at least some configuration data collected from the first configuration item at the second data store comprises copying the at least some configuration data from the first data store to the second data store.

11. The method as recited in claim 7, wherein said storing of at least some configuration data collected from the first configuration item at the second data store comprises:

identifying a transition time, wherein configuration data pertaining to the first configuration item collected after the transition time is stored at the second data store, and wherein configuration data pertaining to the first configuration item collected prior to the transition time is retained at the first data store.

12. The method as recited in claim 7, wherein the initial set of one or more data stores does not comprise the second data store.

13. The method as recited in claim 7, further comprising performing, by the one or more computing devices:

receiving, via a programmatic interface, an indication of a data store preference of the first client, wherein said selecting the initial set is based at least in part on the data store preference.

14. The method as recited in claim 13, wherein the data store preference comprises a directive to store configuration data meeting a specified criterion at a storage resource of a provider network, wherein the storage resource is allocated to a client account of the first client.

15. The method as recited in claim 7, wherein the first data store comprises an instance of one of: a relational database, a non-relational database, an in-memory database, or an unstructured data object stored at a storage service which implements a web-service interface.

16. The method as recited in claim 7, wherein the computing environment comprises a first set of resources of a provider network, and a second set of resources located in a data center external to the provider network.

17. A non-transitory computer-accessible storage medium storing program instructions that when executed on one or more processors cause the one or more processors to:

select an initial set of one or more data stores at which at least a portion of configuration data collected at a configuration discovery service from a computing environment associated with a first client is to be stored;

cause configuration data pertaining to a plurality of configuration items identified in the computing environment to be stored at the initial set of data stores for at least a first time period, wherein the plurality of configuration items comprises a plurality of resources used for one or more applications;

based at least in part on an analysis of one or more operations performed for the first client on the configuration data pertaining to the resources stored at the initial set of data stores, identify, from among the plurality of configuration items identified in the computing environment associated with the first client, a first configuration item as a candidate for a data store change from a first data store to a different data store for storage of additional configuration data of the first configuration item subsequently collected from the first configuration item, wherein the configuration data previously collected from the first configuration item was stored at the first data store of the initial set of data stores in the first time period; and subsequent to the identification of the first configuration item as a candidate for a data store change from the first data store to a different data store for storage of additional configuration data subsequently collected from the first configuration item, initiate storing of at least some of the additional configuration data subsequently collected from the first configuration item at a second data store instead of the first data store in which the configuration data previously collected from the first configuration item was stored.

18. The non-transitory computer-accessible storage medium as recited in claim 17, wherein the instructions when executed on one or more processors cause the one or more processors to:

in response to a detecting that a particular query has been received from the first client, determine that configuration data pertaining to the particular query is stored at a plurality of data stores, including a first data store with a first data format and a second data store with a second data format;

generate, based at least in part on the particular query, a first intermediate query directed to the first data store, and a second intermediate query directed to the second data store;

transmit an aggregated response to the particular query, wherein the aggregated response is based at least in part on (a) a first intermediate response obtained from the first data store, corresponding to the first intermediate query and (b) a second intermediate response obtained from the second data store, corresponding to the second intermediate query.

19. The non-transitory computer-accessible storage medium as recited in claim 17, wherein the instructions when executed on one or more processors cause the one or more processors to:
   identify a security constraint associated with configuration data pertaining to a second configuration item of the plurality of configuration items; and
   select a data store at which configuration data pertaining to the second configuration item is to be stored, based at least in part on the security constraint.

20. The non-transitory computer-accessible storage medium as recited in claim 17, wherein the instructions when executed on one or more processors cause the one or more processors to:
   determine that an indication of a data store preference of the first client has been received via a programmatic interface, and
   utilize the data store preference to select the initial set of one or more data stores.

21. The non-transitory computer-accessible storage medium as recited in claim 17, wherein the computing environment comprises a first set of resources of a provider network, and a second set of resources located in a data center external to the provider network.

* * * * *